United States Patent
Wanner et al.

(10) Patent No.: US 11,956,163 B1
(45) Date of Patent: Apr. 9, 2024

(54) DYNAMICALLY ALLOCATING NETWORK RESOURCES ACCORDING TO WORKLOAD PRIORITIZATION BASED ON ENGAGEMENT AND RESOURCE REQUIREMENTS

(71) Applicant: Dell Products L.P., Round Rock, TX (US)

(72) Inventors: Nicholas Wanner, Austin, TX (US); Harpreet Narula, Austin, TX (US); Tyler Ryan Cox, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/065,280

(22) Filed: Dec. 13, 2022

(51) Int. Cl.
*H04L 41/147* (2022.01)
*H04L 47/762* (2022.01)

(52) U.S. Cl.
CPC .......... *H04L 47/762* (2013.01); *H04L 41/147* (2013.01)

(58) Field of Classification Search
CPC .......................... H04L 47/762; H04L 41/147
See application file for complete search history.

(56) References Cited

U.S. PATENT DOCUMENTS

| | | | |
|---|---|---|---|
| 2020/0358685 A1* | 11/2020 | Gupta | H04L 47/50 |
| 2021/0136147 A1* | 5/2021 | Giassa | H04L 12/2814 |
| 2022/0269542 A1* | 8/2022 | Christensen | G06F 11/3024 |

* cited by examiner

*Primary Examiner* — Ryan J Jakovac
(74) *Attorney, Agent, or Firm* — Norton Rose Fulbright US LLP

(57) ABSTRACT

Systems and methods described herein may provide a system that enables the dynamic assignment of network resources between multiple workloads executing on a network. A computing device may receive workload information relating to a plurality of workloads executing within a network. The computing device may use the workload information to determine engagement and dependency predictions for the plurality of workloads and resource predictions for the plurality of workloads. Based on the workload information and the engagement and dependency predictions, the computing device may determine workload priority predictions for the plurality of workloads. The computing device may assign, based on the resource predictions and workload priority predictions, network resources of the network to the plurality of workloads.

16 Claims, 10 Drawing Sheets

DYNAMICALLY ALLOCATING NETWORK RESOURCES ACCORDING TO WORKLOAD PRIORITIZATION BASED ON ENGAGEMENT AND RESOURCE REQUIREMENTS

FIELD OF THE DISCLOSURE

The instant disclosure relates to information handling systems. More specifically, portions of this disclosure relate to allocating network resources to application executing within a network.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Information handling systems may be used to execute applications such as gaming applications. Aspects of embodiments of this disclosure relate to determine network resource assignments for workloads executing on a network. The network resource assignments may be based on user engagement with the workloads, required resources for the workloads, and/or a workload priority. For example, network resource requirements for the workloads may be predicted (e.g., at multiple service levels) based on workload information, such as a type of application and/or previous network activity. Engagement and dependency predictions may also be generated based on how engaged a corresponding user is (or is likely to be) with a workload based on workload information, such as who the corresponding user is, device peripheral information, and the like. Workload priority predictions may be predicted based on the workload information and the engagement and dependency predictions. The workload priority predictions and the resource predictions may be used to determine network resource assignments for the workloads (e.g., for communications with a network associated with the workloads).

In some embodiments, the aspects described herein may be used to support the execution of gaming applications in different environments. Gaming sessions may execute on a service, either locally on a device, on another system on the network, or in the cloud. A device may access the gaming session by executing an application that communicates with the service to receive and transmit user input to the service and provide feedback to the user from the service. The device may include its own audio/visual (AV) output for displaying a graphical user interface and/or a rendered display from the gaming session. Different environments at a location may include different AV systems, and the device may be automatically paired with an AV system and may be reconfigured to support interaction with an application session using the paired AV system.

A user's home is one example location that may have multiple environments, such as a living room, a dining room, a study, and/or a bedroom, each with different screen configurations, speaker configurations, and/or network availability. Aspects of embodiments disclosed herein may provide a system that enables game play from a set of candidate game hosts and environments to consumption devices of a user's choice while the user moves about their home between the different environments. The system may employ methods to determine where a user is located within the home, availability and selection of candidate game hosting and target environments, homing and direction of related I/O, and/or AV for consumption. The system then migrates the user and their information to the determined environment by coordinating gameplay by the user. The solution accommodates multiple users simultaneously within the home, whether in single player, multiplayer using the same screen, or multiplayer using separate screen games. The solution may configure AV and input/output (I/O) such that multiple users can consume one or multiple games in the home simultaneously, whether in separate locations or when seated together in front of the same consumption device, e.g., a large television, where multiple games might be hosted simultaneously.

According to one embodiment, a method for execution by an information handling system, such as a hub device, includes receiving workload information relating to a plurality of workloads executing within a network; determining, based on the workload information, engagement and dependency predictions for the plurality of workloads and resource predictions for the plurality of workloads; determining, based on the workload information and the engagement and dependency predictions, workload priority predictions for the plurality of workloads, wherein the engagement and dependency predictions are determined based on user information associated with at least a subset of the plurality of workloads; and assigning, based on the resource predictions and workload priority predictions, network resources of the network to the plurality of workloads.

The method may be embedded in a computer-readable medium as computer program code comprising instructions that cause a processor to perform operations corresponding to the steps of the method. In some embodiments, the processor may be part of an information handling system including a first network adaptor configured to transmit data over a first network connection; and a processor coupled to the first network adaptor and the memory.

As used herein, the term "coupled" means connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified, and includes what is specified (e.g., substantially parallel includes parallel), as understood by a person of ordinary skill in the art.

The phrase "and/or" means "and" or "or". To illustrate, A, B, and/or C includes: A alone, B alone, C alone, a combination of A and B, a combination of A and C, a combination of B and C, or a combination of A, B, and C. In other words, "and/or" operates as an inclusive or.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus or system that "comprises," "has," or "includes" one or more elements possesses those one or more elements, but is not limited to possessing only those elements. Likewise, a method that "comprises," "has," or "includes" one or more steps possesses those one or more steps, but is not limited to possessing only those one or more steps.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1:
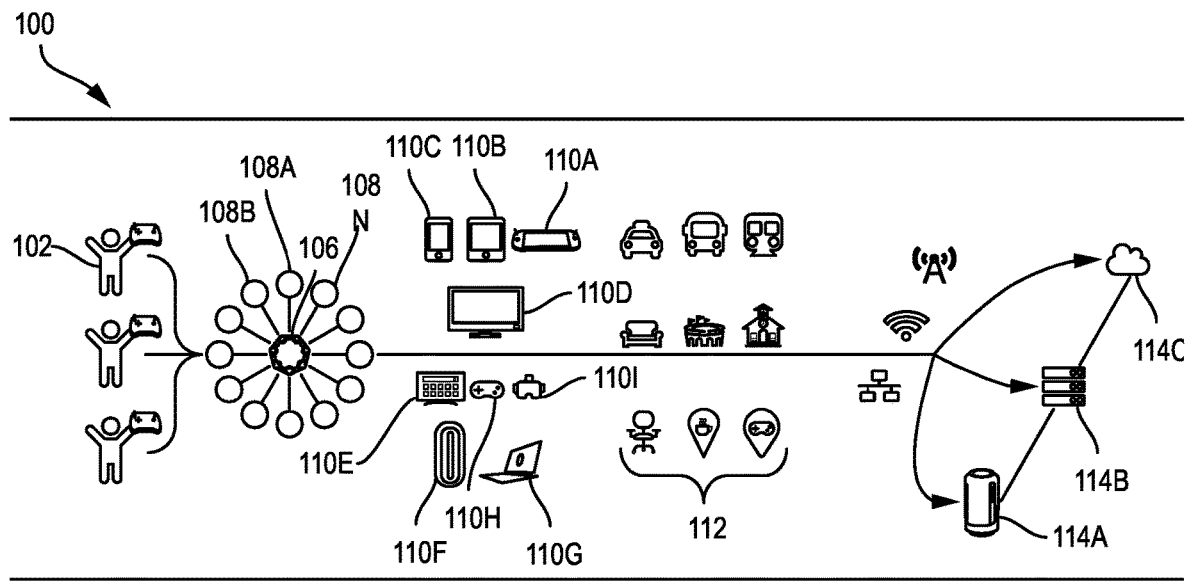
FIG. 1 is a block diagram illustrating aspects of a configurable system for providing services to users according to some embodiments of the disclosure.

These example embodiments describe and illustrate various aspects of a configurable and dynamic gaming environment that can be supported through the use of a hub device, which may be an information handling system. A hub device may be located in a user's home and used to arrange game play sessions (or more generically application sessions) between host devices and services. The host devices may execute an application for receiving an AV stream for displaying rendered content from a game play session (or other application session) and in some configurations also receive user input for interacting with the session from a peripheral device, such as a gaming controller. The AV stream presented by the host device may be generated by a service. The service may execute on the hub device or another information handling system, such as a cloud computing resource. A home may include one or several host devices (e.g., televisions, mobile computers, tablet computers, and personal computers) and may include one or several information handling systems executing the service (e.g., hub devices and personal computers).

The user's home may be divided into different environments defined by a space around a host device. For example, a living room with a television may be one environment, and a bedroom with a personal computer may be another environment. A user may use a peripheral device in one of the environments, and the hub device may configure a host device, a service, and the peripheral device for operation in the environment by determining the corresponding environment using a knowledge graph. The knowledge graph provides a database of historical information about the environments from which the hub device may use current characteristics of the peripheral device to deduce the location, and thus current environment, of the peripheral device. For example, the knowledge graph may include information about location of rooms (e.g., environments) in the house based on wireless signatures of devices within the different rooms. This difference in signatures reflects that a device on one side of the house may receive beacon signals from different neighboring access points than a device on an opposite side of the house. When a user carries the peripheral device around the house, the hub device may determine a location of the peripheral device based on visible access points to the peripheral device. Other example characteristics beyond wireless signature for determining location are described in further detail below, and the knowledge graph may be used to combine different characteristics to identify the location, and thus environment, of the peripheral device.

Based on the location of the peripheral device determined from the knowledge graph, the hub device may initialize an application session for the peripheral device by determining an appropriate host device and service for the application session. For example, if the peripheral device is in the living room and is requesting a game that is within the capabilities of the service on the hub device to execute, the hub device may initialize an application session for the peripheral device between the television as a consumption device and the hub device as a service. The service on the hub device executes the game and streams rendered content to an application executing on the television consumption device.

The hub device may be used to migrate the peripheral device to a different environment and/or migrate the application session between host devices and/or services. For example, initially the application session may use a communication link between the peripheral device and the television host device for receiving user input, in which the application executing on the television host device relays user input to the service through a backhaul communication link from the television host device to the hub device. During the application session, the hub device may monitor characteristics of the peripheral device, including signal strength of connection to other components, and determine that the communication link from the peripheral device to the hub device is stronger than the communication link from the peripheral device to the television host device. The hub device may migrate the peripheral device to a communications link with the hub device such that the service executing on the hub device directly receives the user input but the streaming session continues from the service to the application executing on the television host device. Such a change is illustrated in the change in configuration from FIG. 3A to the configuration of FIG. 3B described in further detail below.

Other aspects of the application session may also be migrated. For example, if the peripheral device is determined to move to a different environment, then the hub device may migrate the application session to an application executing on a host device within the new environment. As another example, if a connection between the television host device and the service becomes unstable, the hub device may recommend and/or initiate a migration of the application session to a different host device. One scenario for such a migration may be where the television host device is connected through a wireless link to the service in which the wireless link quality is reducing quality of the streaming, and a second host device with a wired connection is available in a nearby environment. Each of these example migrations may be determined based on information in the knowledge graph regarding locations of environments and capabilities within those environments. As yet another example, a user may request execution of an application, such as a particular game, during the application session for which a better configuration exists than the current host device and/or current service. The request for a different application, such as a game or other application requiring a certain GPU capability, may cause the hub device to determine that a second device executing a second service is better for hosting the application and migrate the peripheral device to the second service by, for example, reconfiguring network connections.

The hub device may support connecting to multiple peripheral devices. In one example, the hub device may support two peripheral devices using a shared session on one host device to play the same or different games on the host device. In another example, the hub device may support two peripheral devices in different environments using different sessions with different host devices. The hub device may determine the environment of each of the peripheral devices based on characteristics of the device and the knowledge graph and configure application sessions for each of the peripheral devices accordingly. Different arrangements of peripherals and players may be supported. For example, one hub device executing a service and one host device executing an application can support a configuration with Game A and one player (P1) with peripheral (C1) and Game B and one player (P2) with peripheral (C2); or can support a configuration with Game A and one player (P1) with peripheral (C1) and Game A and one player (P2) with peripheral (C2); or can support a configuration with Game A and two players (P1, P2) with peripherals (C1, C2).

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen, and/or a video display. The information handling system may also include one or more buses operable to transmit communications between the various hardware components.

FIG. 1 is a block diagram illustrating aspects of a configurable system for providing services to users according some embodiments of the disclosure. A system 100 includes users 102 who may have access to a shared library of applications 106 including applications 108A-108N. The users 102 may have separate libraries, with some overlapping applications between the libraries. The users 102 may access the library 106 through devices 110A-I, such as mobile gaming device 110A, tablet computing device 110B, phone computing device 110C, television 110D, personal computing device 110E, desktop computing device 110F, laptop computing device 110G, game controller 110H, or VR headset 110I. The devices 110 may access services at any of locations 112, including cars, buses, homes, hotels, offices, parks, etc. One or more of the devices 110 may communicate with an application session executing on a computing device 114, such as a home application hub 114A, a server 114B, or a cloud execution environment 114C. In some embodiments, environments may only exist for fixed devices, e.g., desktop computers, televisions, etc.

Figure 2:
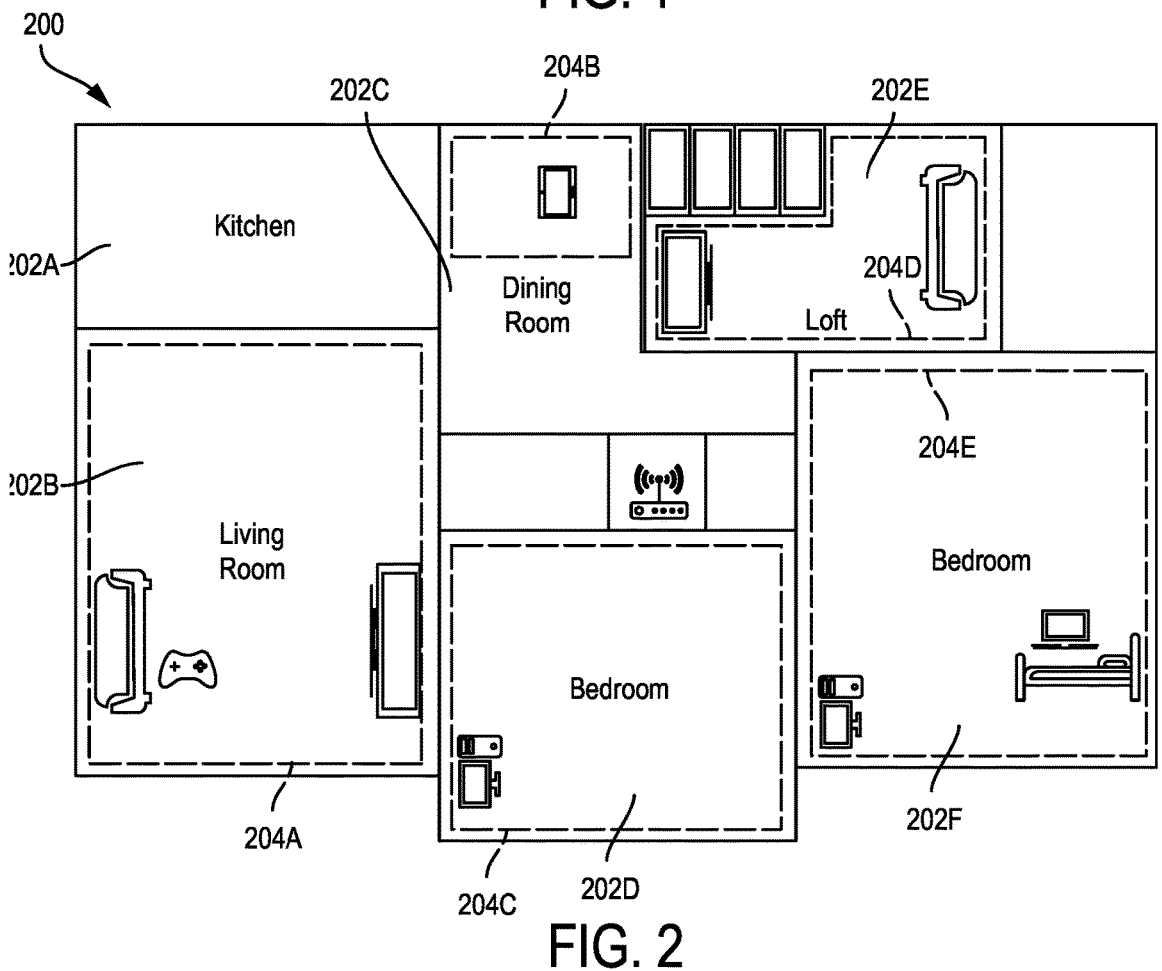
FIG. 2 is a block diagram illustrating possible game environments according to some embodiments of the disclosure.

FIG. 2 is a block diagram illustrating possible game environments according to some embodiments of the disclosure. A user's home 200 may include rooms 202A-F, and each of the rooms may have different information handling systems present, different AV equipment present, and/or different characteristics. For example, a living room 202B may include a large-size television, a bedroom 202D may include a personal computer, and a dining room 202C may include a table computing device. Gaming environments 204A-E in the home 200 may be defined based on spaces where a user is likely to execute an application session. Each gaming environment 204A-E may include numerous devices and gaming environments, devices that may or may not be capable of hosting games, and/or devices that may or may not be capable of receiving game output. A system 100 may allow multiple users in the home 200 to simultaneously execute an application session. In some embodiments, multiple games may be hosted on a single device. In some embodiments, multiple games may target a single output device. In some embodiments, an application or other computing services manages where games should be hosted, where game output should go, and how to best route peripheral I/O for users.

A user may move between gaming environments 204A-E within the home 200 and continue an application session. For example, a user may take a device, such as a gaming controller, from environment 204A to environment 204C. The gaming controller may migrate and reconfigure for operation in environment 204C from a configuration for environment 204A. For example, the controller may transition from an application hosted on a TV in living room 202B to an application hosted on TV in dining room 202C while remaining connected to a host service executing on a PC in bedroom 202D.

Figure 3A:
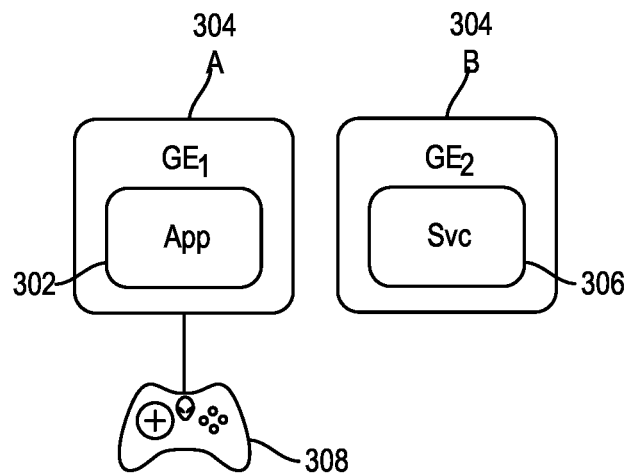
FIG. 3A is a block diagram illustrating application and services hosted in different gaming environments according to some embodiments of the disclosure.

Example configurations for applications and services in gaming environments are shown in FIGS. 3A-3D. FIG. 3A is a block diagram illustrating application and services hosted in different gaming environments according to some embodiments of the disclosure. In FIG. 3A, a first gaming environment 304A may include a device, such as a TV or PC, hosting an application 302, which is an endpoint for an application session such as a gaming session. The application 302 communicates with a service 306, which may be hosted on a device in a different gaming environment 304B. A controller 308 may communicate with the application 302 to receive user input for the application session to control, for example, a character in a game. In some embodiments, the controller 308 is connected to the environment 304A hosting the application and the I/O is configured to be relayed to the environment 304B hosting the actual game.

Figure 3B:
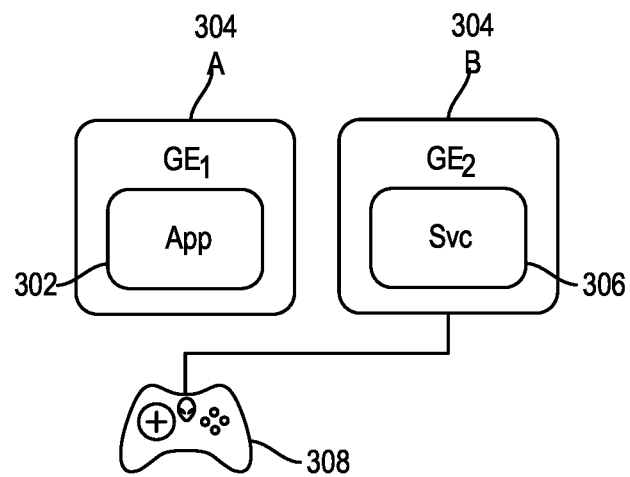
FIG. 3B is a block diagram illustrating application and services hosted in different gaming environments according to some embodiments of the disclosure.

Another arrangement for the application and service is shown in FIG. 3B. FIG. 3B is a block diagram illustrating application and services hosted in different gaming environments according to some embodiments of the disclosure. In FIG. 3B, the controller 308 communicates with the service 306 for providing user input to an application session, with the AV rendering target of the application session being application 302 in a different gaming environment.

Figure 3C:
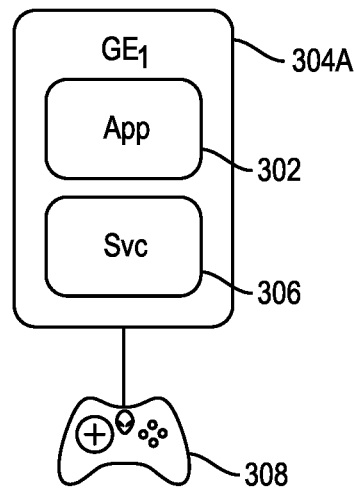
FIG. 3C is a block diagram illustrating application and service hosted in a common gaming environment according to some embodiments of the disclosure.

Another arrangement for the application and service is shown in FIG. 3C. FIG. 3C is a block diagram illustrating application and service hosted in a common gaming environment according to some embodiments of the disclosure. In FIG. 3C, the application 302 and the service 306 are executed in the same gaming environment 304A, which may be a single device, two devices, or a combination of devices in the gaming environment 304A. The controller 308 may communicate with either the service 306 and/or the application 302.

Figure 3D:
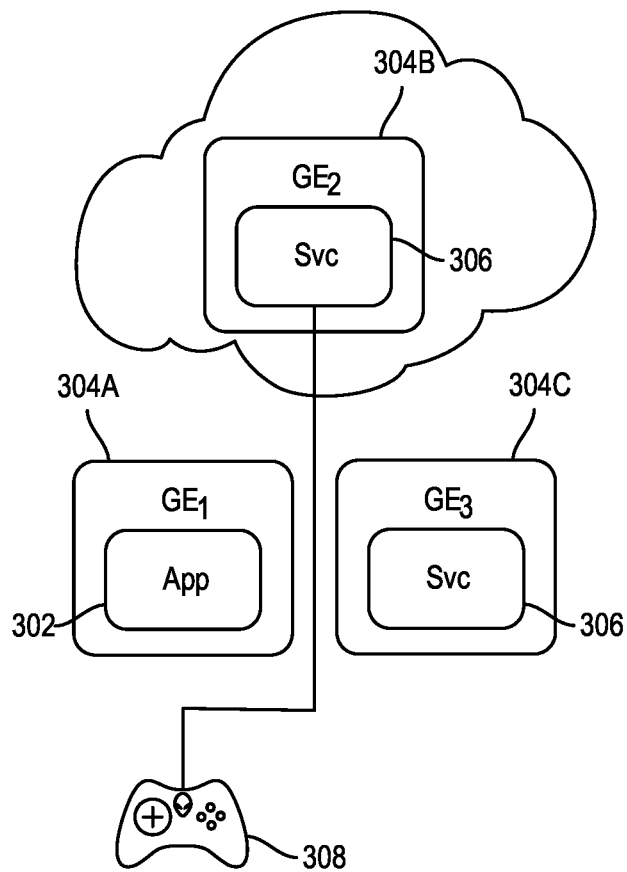
FIG. 3D is a block diagram illustrating a cloud-based service arrangement for a gaming environment according to some embodiments of the disclosure.

A further arrangement for the application and service is shown in FIG. 3D. FIG. 3D is a block diagram illustrating a cloud-based service arrangement for a gaming environment according to some embodiments of the disclosure. In FIG. 3D, the controller 308 may communicate with a service 306 hosted in a gaming environment 304B that is remote from the gaming environment 304A in which the application 302 is executing. The service 306 may be executing, for example, on a remote device, such as when the user's home includes the gaming environment 304B but the user is engaging with application 302 at a location on a different network from their home (e.g., at a friend's house). The service 306 may also or alternatively be executed, for example, on a cloud computing device available as a subscription service to the user.

Figure 4:
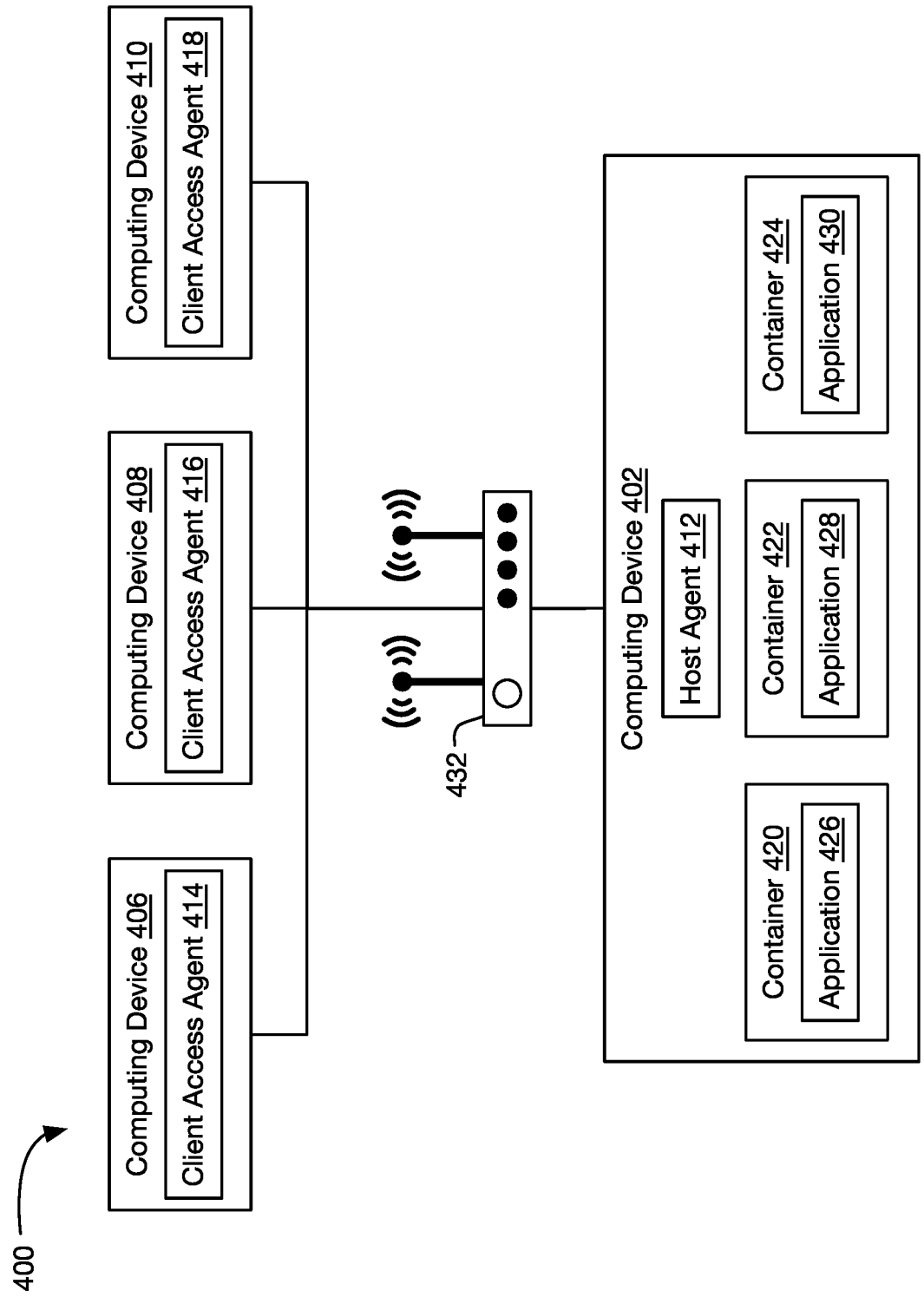
FIG. 4 is a system for provisioning computing services on a local network according to an exemplary embodiment of the present disclosure.

FIG. 4 is a block diagram of a system 400 according to an exemplary embodiment of the present disclosure. The system 400 includes an access point 432 and computing device 402, 406, 408, 410. The system 400 may be configured to provision one or more gaming environments or other computing services to the computing device 406, 408, 410. In particular, the access point 432 may implement a network and the system 400 may be configured to provision various computing services to computing devices 406, 408, 410 connected to the network. The network may be implemented within a particular physical location. For example, the network may be implemented within a physical premises, such as a home, an office, or other facility. In certain instances, the network may be implemented as a local network (e.g., a local area network), a virtual private network, L1, and/or a global network (e.g., the Internet).

The computing devices 402, 404, 406, 408 may be communicatively coupled to the network. For example, the computing devices 402, 404, 406, 408 may communicate with the network using one or more wired network interfaces (e.g., Ethernet interfaces) and/or wireless network interfaces (e.g., Wi-Fi®, Bluetooth®, and/or cellular data interfaces). In certain implementations, the computing device 402 may communicate with the access point 432 using a wired network interface, and one or more of the computing devices 406, 408, 410 may communicate with the access point 432 using a wireless network interface. In certain implementations, the computing device 402 may be collocated with the access point 432 (e.g., may be located within 1-5 feet of the access point 432).

In certain implementations, the computing devices 406, 408, 410 may access, via the access point 432, one or more services provided by the computing device 402. For example, the computing device 402 includes a host agent 412 and containers 420, 422, 424. The containers 420, 422, 424 implement applications 426, 428, 430. The host agent 412 may be configured to provision one or more services to requesting computing devices 406, 408, 410. In particular, requested applications 426, 428, 430 may be implemented within one or more containers 420, 422, 424 executing on the computing device 402. For example, the containers 420, 422, 424 may be provisioned with portions of hardware from the computing device 402 (e.g., CPU/GPU cores, CPU/GPU available time, storage capacity, memory capacity), and the corresponding applications 426, 428, 430 may execute within the containers 420, 422, 424 using the provisioned hardware. In particular, the computing device 402 may receive a request to execute a particular application from one of the computing devices 406, 408, 410, and the host agent 412 may instantiate a corresponding container that implements the requested application.

The applications 426, 428, 430 may include various types of computing processes and computing applications. In certain implementations, the application 426, 428, 430 may include one or more gaming applications, entertainment applications, communication applications, and productivity applications. Gaming applications may include executing video game programs on behalf of the computing devices 406, 408, 410 and may also include other video game-related services, such as video game platforms to purchase, download, and/or update video games. Entertainment applications may include one or more of video streaming applications, video downloading applications, audio streaming applications, audio downloading applications, and the like. Communication applications may include one or more teleconferencing applications, video conferencing applications, e-mail applications, messaging applications, and the like. Productivity applications may include one or more of word processing applications, data processing applications, task management applications, development environments, and the like. One skilled in the art will appreciate that various types of applications 426, 428, 430 may be implemented within containers 420, 422, 424 executing on the computing device 402.

The computing devices 406, 408, 410 include client access agents 414, 416, 418. In certain implementations, interactions between the computing devices 406, 408, 410 and the computing device 402 may occur via the client access agents 414, 416, 418. The client access agents 414, 416, 418 may be programs executing on the computing devices 406, 408, 410 that communicate with the host agent 412 to control execution (e.g., begin execution, stop execution, pause execution, resume execution) of applications 426, 428, 430 by the computing device 402 on behalf of the computing devices 406, 408, 410. The client access agents 414, 416, 418 may also receive data from the computing device 402 (e.g., via host agent 412) during execution of requested applications 426, 428, 430. For example, video data and/or audio data from an application 426, 428, 430 (e.g., a gaming application) may be streamed to a requesting computing device 406, 408, 410 via the client access agents 414, 416, 418. Furthermore, additional commands or inputs may be received from the computing devices 406, 408, 410 during execution of the applications 426, 428, 430. For example, the client access agents 414, 416, 418 may also receive commands from a user and may transmit the commands to the computing device 402 (e.g., video game inputs). In certain implementations, client access agents 414, 416, 418 may also enable user switching of associated devices. In certain implementations, client access agents 414, 416, 418 may enable users to select and resume certain computing sessions on the computing device 402. For example, a user may initiate execution of the application 426 via the computing device 406 and may switch to the computing device 408 (e.g., when transitioning between gaming environments). In such instances, the client access agents 414, 416, 418 may communicate with the host agent 412 to pause execution of the application 426 (e.g., via the client access agent 414) and to resume execution of the application 426 (e.g., via client access agent 416) once the user has switched computing devices.

In certain implementations, the computing device 402 may implement various applications 426, 428, 430 without being requested to by one of the computing devices 406, 408, 410. For example, the host agent 412 may be configured to provide one or more of user management services, container management services, application updating services, subscription management services, guest management services, and/or user presence detection services. Similarly, the computing device 402 may be configured to implement one or more platform integration services, social presence and communication services, video game library aggregation services, video game launching services, streaming management services, content installation management and update management services, settings management services, account management services, and/or telemetry/statistics collection and analytics services. In certain implementations, the computing device 402 may perform one or more networking services for the access point 432. For example, the computing device 402 may execute one or more networking services to improve the quality of networking services provided to the computing devices 406, 408, 410 by the access point 432. In certain implementations, the computing device 402 may execute one or more voice command services to receive and process voice commands from one or more users (e.g., from one of the computing devices 406, 408, 410). For example, voice commands may be received to control execution of applications 426, 428, 430 (e.g., to begin, pause, and resume execution of gaming applications).

In certain implementations, the computing device 402 may additionally execute applications 426, 428, 430 that are not on behalf of other computing devices 406, 408, 410 (e.g., within containers and/or separate from containers). For example, the computing device 402 may be coupled to a display and may be configured to present results of the applications 426, 428, 430 via the display. In one particular implementation, the computing device 402 may be used as a local gaming device, executing gaming applications for presentation via the display. In certain implementations, the computing device 402 may be configured to simultaneously serve as a local gaming device and to execute applications 426, 428, 430 on behalf of other computing devices 406, 408, 410.

The computing devices 402, 404, 406, 408 may also include processors and memories (not depicted). The processors and memories may implement one or more aspects of the computing devices 402, 404, 406, 408. For example, the memories may store instructions which, when executed by the processors, may cause the processors to perform one or more operational features of the computing devices 402, 404, 406, 408. The processors may be implemented as one or more central processing units (CPUs), field programmable gate arrays (FPGAs), and/or graphics processing units (GPUs) configured to execute instructions stored on the memory.

Figure 5:
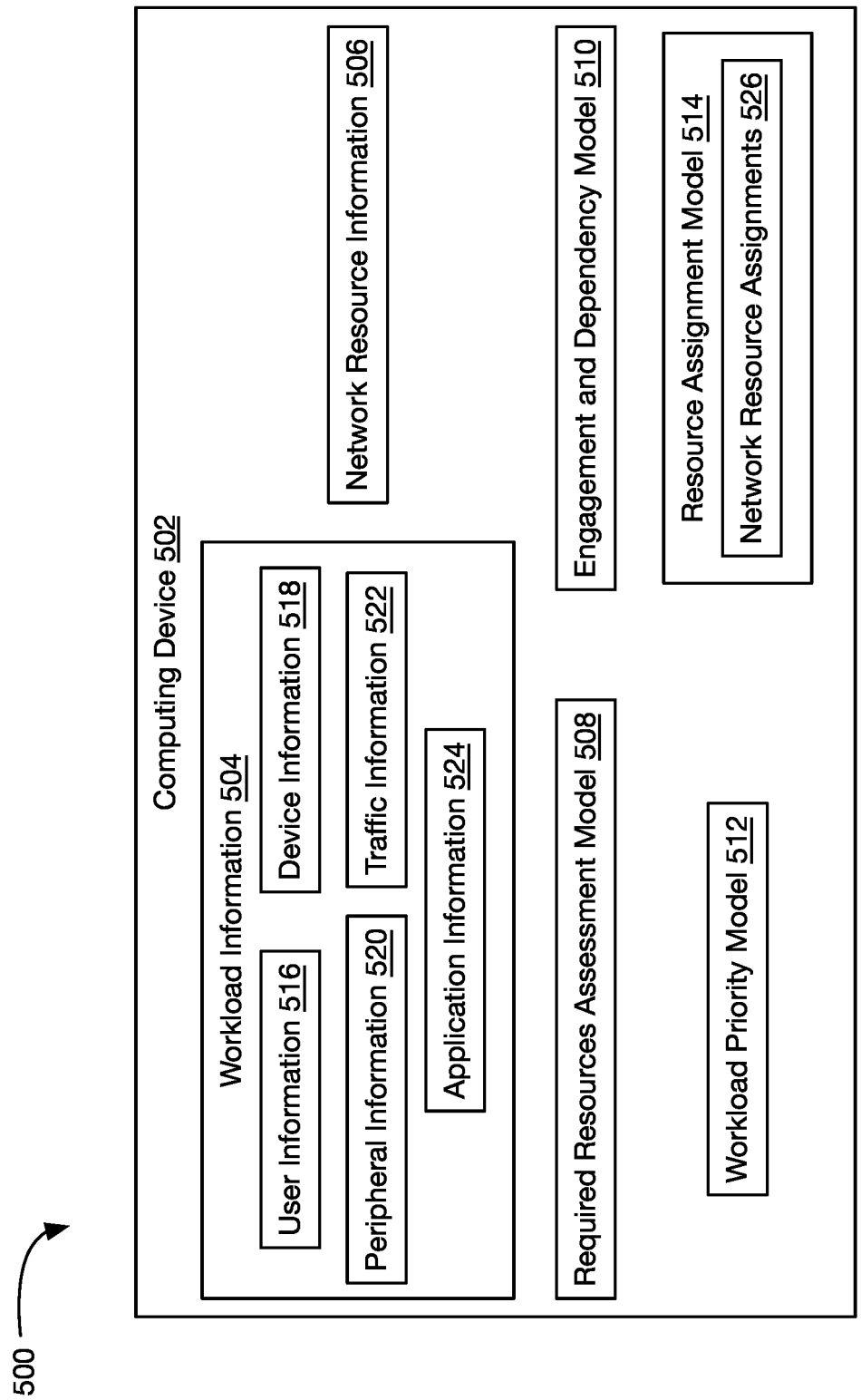
FIG. 5 depicts a system according to an exemplary embodiment of the present disclosure.

FIG. 5 depicts a system 500 according to an exemplary embodiment of the present disclosure. The system 500 may be configured to assign network resources between multiple workloads. For example, the system 500 includes a computing device 502, which may be connected to a network and may be configured to assign network resources to workloads on the network. In certain implementations, the computing device 502 may be an exemplary implementation of the computing device 402.

The computing device 502 includes workload information 504 and network resource information 506. The computing device 502 may be configured to receive workload information 504 relating to a plurality of workloads executing within a network. Workloads may include one or more applications executing on one or more computing devices that are utilizing the network to communicate with one another. For example, the workloads may utilize the network to communicate with other computing devices on the network and/or to communicate with other external computing devices (e.g., via the internet). Exemplary workloads may include one or more of teleconferencing workloads, video-conferencing workloads, audio streaming workloads, video streaming workloads, gaming workloads, file transfers workloads, email workloads, and/or remote desktop workloads. The computing device 502 may also include a processor and a memory (not depicted). Computing devices (e.g., including the computing device 502) may communicate with the network using one or more wired network interfaces (e.g., Ethernet interfaces) and/or wireless network interfaces (e.g., Wi-Fi®, Bluetooth®, and/or cellular data interfaces). In certain instances, the network may be implemented as a local network (e.g., a local area network), a virtual private network, and the like.

In certain implementations, at least a subset of the plurality of workloads corresponds to the same computing device 502. In certain implementations, at least a subset of the plurality of workloads corresponds to different computing devices. In certain implementations, two or more workloads may correspond to the same user on different computing devices.

The workload information 504 includes user information 516, device information 518, peripheral information 520, traffic information 522, and application information 524. The user information 516 may contain information regarding one or more users associated with a particular workload (e.g., one or more users that are interacting with the workload, one or more users that caused the workload to execute). For example, the user information 516 may include user profiles associated with one or more users of the network (such as one or more users associated with one or more workloads on the network). In various implementations, the user information 516 may include identifying information regarding the user, usage patterns for the user, and/or priority information for the user. For example, the user information 516 may include one or more of hierarchy information for a user (e.g., a priority of a user within a given household, facility, company, or other organization), age of a user, persona of a user, common workload habits of a user (e.g., frequent gamer, works from home, student, videoconferencing, remote computing device access), typical usage times for a user, calendar schedule for a user, common types of computing devices for a user, and the like.

In various implementations, the device information 518 may include information regarding a particular computing device associated with a workload (e.g., from which the workload is accessing the network). For example, the device information 518 may include one or more of a network priority for the device, a power state of the device (e.g., plugged in, on battery), a device type, and the like.

The peripheral information 520 may include information regarding one or more peripheral devices connected to a computing device associated with a workload and/or information received from connected peripheral devices. For example, the peripheral information 520 may include indicators of connected peripheral devices (e.g., cameras, microphones, game controllers, keyboard, mouse) and may include information received from connected devices (e.g., whether a user is looking at the screen, whether a user is speaking, whether a user has moved their mouse recently, whether a user has touched a touchscreen recently).

In various implementations, the traffic information 522 may include information regarding network traffic (e.g., network telemetry) for an associated workload. For example, the traffic information 522 may include a type of traffic for a workload (e.g., high bandwidth traffic, low latency traffic, video streaming traffic) and/or traffic destinations for a workload (e.g., destination ports, geographic destinations, local network communications vs. external network communications).

In various implementations, the application information 524 may include information regarding one or more applications associated with a corresponding workload (e.g., application(s) that are accessing the network). For example, the application information may include a type of application (e.g., teleconferencing, videoconferencing, audio streaming, video streaming, gaming, file transfers, email, remote desktop). Certain types of applications may include additional contextual information. For example, application information for gaming applications may further specify a type of game for the application (e.g., a massively-multiplayer online role playing game, a first person shooter, a real-time strategy game, a battle royale game).

The computing device 502 may also be configured to receive network resource information 506 concerning the network for which resources will be managed and assigned. The network resource information 506 may identify an operational capacity for the network which may include information regarding the capabilities of one or more base stations within the network and/or the capabilities regarding an external connection for the network (e.g., to the Internet). For example, the network resource information 506 may indicate a local network bandwidth, a maximum bandwidth for communication with particular computing devices on the network, available network ports, available base stations, frequency ranges for the base stations, simultaneous communication bands for the base stations, external connection bandwidth, and the like.

The computing device 502 further includes a workload priority model 512, an engagement and dependency model 510, and a required resources assessment model 508. The computing device 502 may utilize the models 508, 510, 512 to evaluate and prioritize multiple workloads utilizing the network. In particular, the required resources assessment model 508 may be configured to generate resource predictions for workloads on the network. In certain implementations, the resource predictions are determined to indicate network resources required for at least one quality of service for respective workloads. The engagement and dependency model 510 may be configured to determine engagement and dependency predictions for workloads on the network. In certain implementations, the engagement and dependency predictions are determined to indicate at least one of (i) user engagement for respective workloads and/or (ii) multi-user dependencies for the respective workloads. The workload priority model 512 may be configured to generate workload priority predictions for workloads on the network. In certain implementations, the workload priority predictions are determined to indicate relative priorities for network resources between the workloads (e.g., priority scores for workloads relative to one another). The models 508, 510, 512 are discussed in greater detail below in connection with FIGS. 6-8.

The computing device 502 further includes a resource assignment model 514 which may be configured to generate network resource assignments 526 for workloads on the network. In particular, the resource assignment model 514 may generate the network resource assignments 526 based on information or predictions received from one or more of the models 508, 510, 512. For example, the resource assignment model 514 may receive resource predictions from the required resources assessment model 508 and may receive workload priority predictions from the workload priority model 512. The resource assignment model 514 may then generate the network resource assignments 526 based on the received information.

The network resource assignments 526 may indicate an amount of assigned network resources for each of at least a subset of workloads on the network (e.g., workloads for which workload information 504 is received). The assigned network resources may include an indication of how much network bandwidth is allocated to the workloads. In certain implementations, the assigned network resources may also include other network resources, such as packet priority, dedicated network ports, dedicated network hardware (e.g., a dedicated antenna band), a dedicated frequency range, dedicated network channels, and the like.

In certain implementations, the network resource assignments are generated such that all workloads corresponding to workload priority predictions that exceed a predetermined threshold are assigned at least a minimum amount of network resources identified by corresponding resource predictions. In certain implementations, workloads with higher priorities may be assigned additional network resources that exceed the minimum amount of network resources identified by corresponding resource predictions 610. In certain implementations, the assigned network resources include an amount of dedicated network traffic.

The network resource assignments 526 may then be provided to a router, base station, or other network administration computing devices. For example, the computing device 502 may be an exemplary implementation of the computing device 402 and may be communicatively coupled to the access point 432. The computing device 502 may provide the network resource assignments 526 to the access point 432. The access point 432 may then limit network resources used by the workloads (e.g., for packets associated with the workloads) based on corresponding resources assigned in the network resource assignments 526. In additional or alternative implementations, the computing device 502 may itself serve as an access point for a network. In such instances, the network resource assignments 526 may be provided to a network service of the computing device 502 which may similarly limit network resources used by the workloads based on corresponding resources assigned in the network resource assignments 526.

Figure 6:
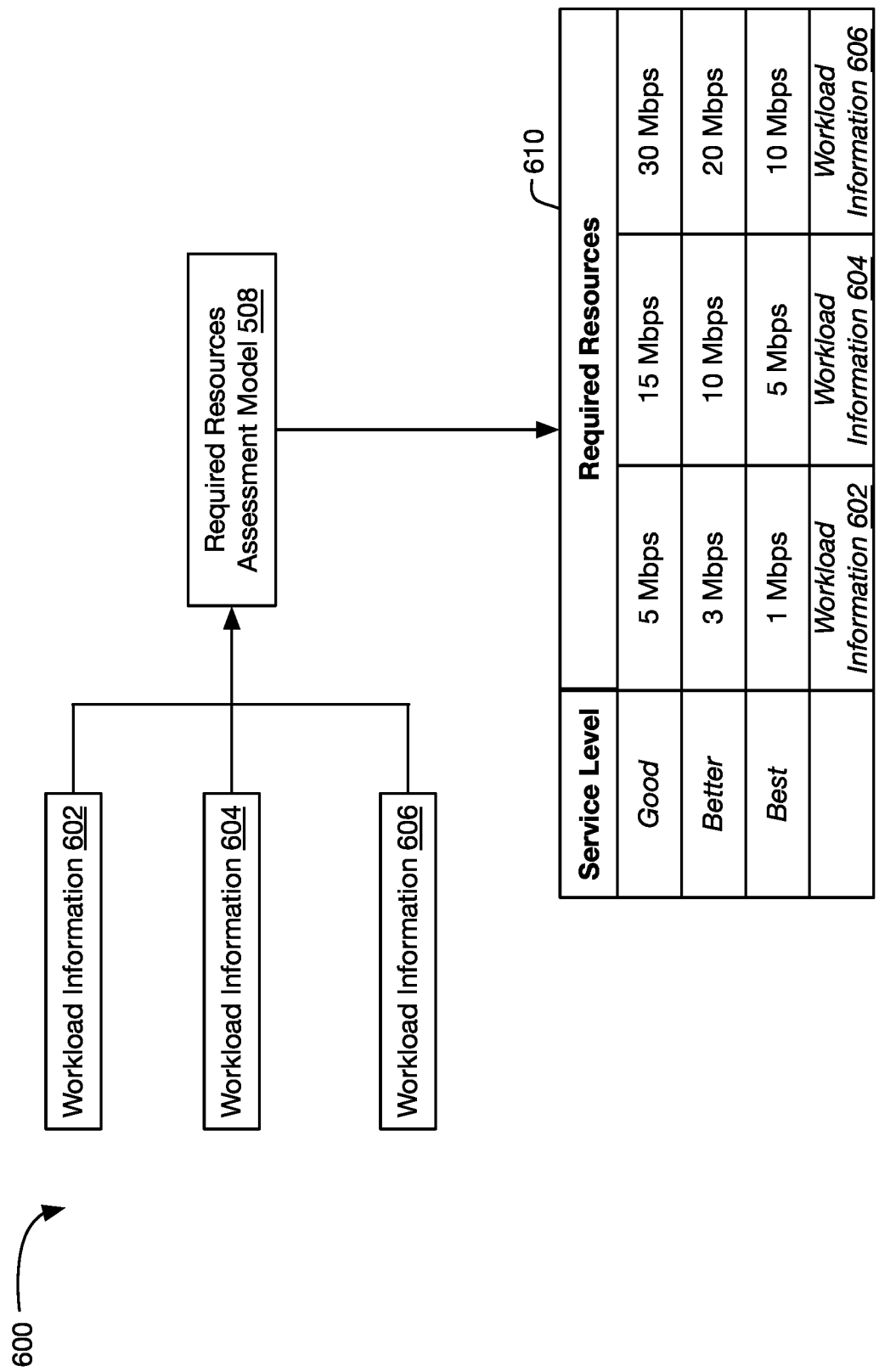
FIG. 6 depicts an operation to compute resource predictions according to an exemplary embodiment of the present disclosure.

FIG. 6 depicts an operation 600 to compute resource predictions according to an exemplary embodiment of the present disclosure. The operation 600 includes the required resources assessment model 508, workload information 602, 604, 606 and resource predictions 610 generated by the required resources assessment model 508. The workload information 602, 604, 606 may be an exemplary implementation of the workload information 504. The resource predictions 610 may be determined to indicate network resources required for at least one quality of service for respective workloads. In certain implementations, the required resources assessment model 508 may compute the required resources predictions 610 at multiple levels of quality (e.g., good quality, better quality, best quality) as depicted. The predicted amount of network resources required for each quality of service may differ depending on the type of workload. In particular, the workload information 602, 604, 606 may include application information 524 and peripheral information 520. For example, the workload information 602 may indicate that the corresponding workload is for web browsing, the workload information 604 may indicate that the corresponding workload is for a video conference with both video and microphone enabled, and the workload information 606 may indicate that the corresponding workload is for gaming in a particular context (e.g., competitive multiplayer games). In such instances, the resource predictions 610 may be determined based on the application information 524 and peripheral information 520. In particular, different types of applications (and different contexts for those applications) may need different amounts of network resources for proper performance. For example, gaming may require more network resources than video conferencing, and video conferencing may require more network resources than web browsing. Further, certain contexts of the same type of application may require more network resources. For example, competitive online multiplayer first-person shooter games may require more network resources than casual real-time strategy games. Accordingly, the resource predictions 610 indicate different levels of network resources based on the workload information 602, 604, 606.

Figure 7:
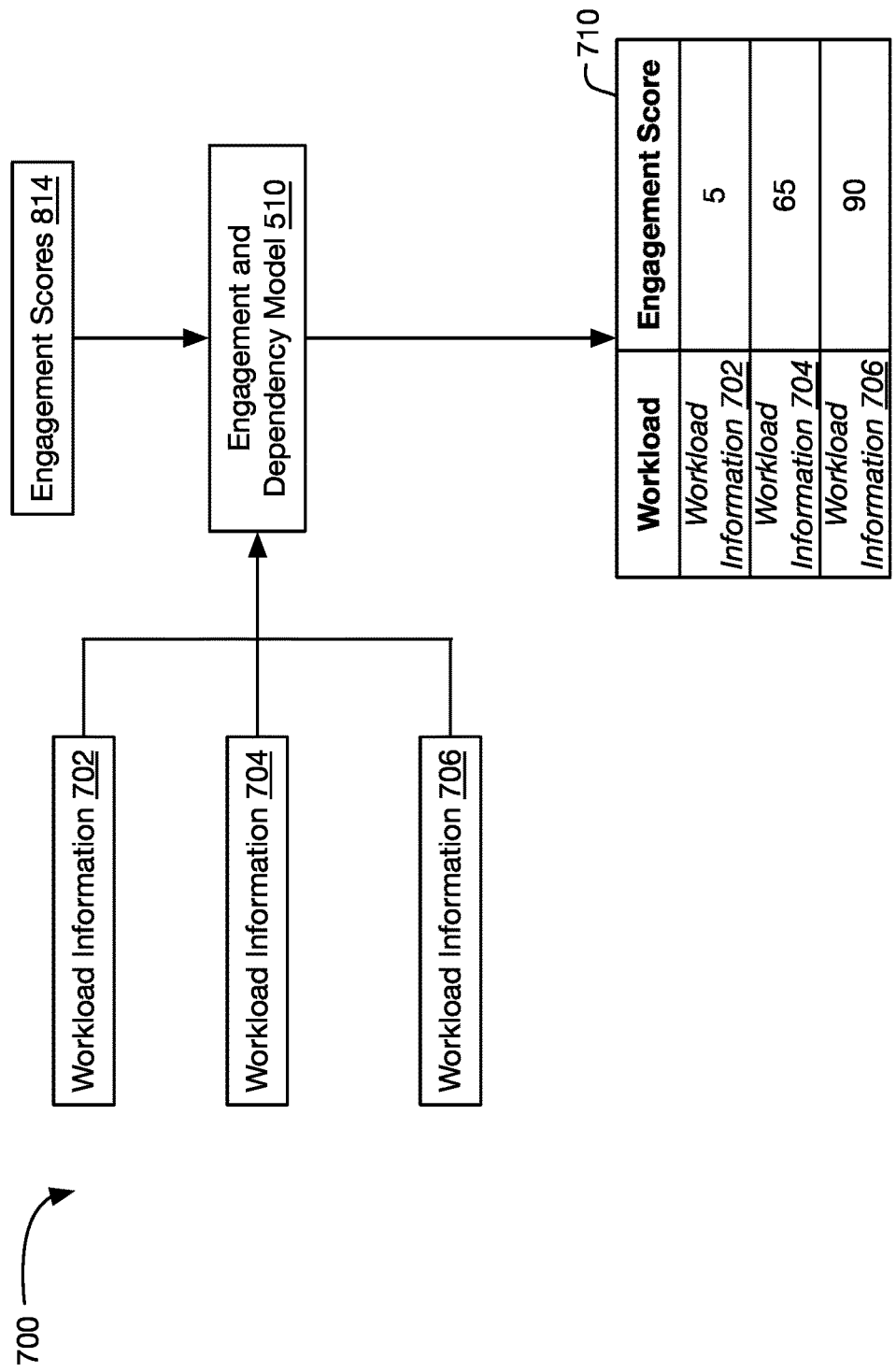
FIG. 7 depicts an operation to compute engagement and dependency predictions according to an exemplary embodiment of the present disclosure.

FIG. 7 depicts an operation to compute engagement and dependency predictions 710 according to an exemplary embodiment of the present disclosure. The operation 700 includes an engagement and dependency model 510, workload information 702, 704, 706, and engagement and dependency predictions 710 generated by the models 510. The workload information 702, 704, 706 may be an exemplary implementation of the workload information 504. The engagement and dependency predictions 710 may be determined to indicate at least one of (i) user engagement for respective workloads and/or (ii) multi-user dependencies for the respective workloads. The engagement and dependency model 510 may be configured to determine the engagement and dependency predictions 710 based on the workload information 702, 704, 706. For example, the workload information 702, 704, 706 may include peripheral information 520, traffic information 522, and application information 524. In such instances, the engagement and dependency predictions 710 may be determined based on the peripheral information 520, the traffic information 522, and the application information 524. For example, the workload information 702 may indicate that a single user is playing a game but is currently looking away from their screen (e.g., based on a connected camera peripheral), is not actively communicating with other players (e.g., based on application state and/or a connected microphone peripheral), and is waiting in a game lobby for a multiplayer match to start. The workload information 704 may indicate that that two users are streaming video content and are actively watching the content The workload information 706 may indicate that three users on the same network are attending a video conference (e.g., from three separate computing devices), that two of the users are actively listening, and that one of the users is presenting (e.g., based on an application status) with their camera and microphone status (e.g., based on an application status and/or connected camera and microphone peripherals). The engagement and dependency model 510 may compute the engagement and dependency predictions 710 based on the number of users and/or the level of engagement for users associated with the workload. For example, the engagement and dependency model 510 may compute higher scores for workloads with more associated users and/or with users demonstrating higher levels of engagement. In particular, as depicted, the workload information 706 receives a higher score than the workload information 704 which receives a higher score than the workload information 702.

In practice, it should be noted that multiple workloads may be associated with the same user and/or with the same computing device. In such instances, different workloads associated with a particular user or a particular computing device may receive different engagement scores. For example, a user may be playing a video game and, on the same computing device, may be streaming video content. The user may be actively engaged in the video game but may not be actively watching the video content. Accordingly, the engagement and dependency model 510 may compute a higher engagement score for the video game workload than for the video content workload.

Figure 8:
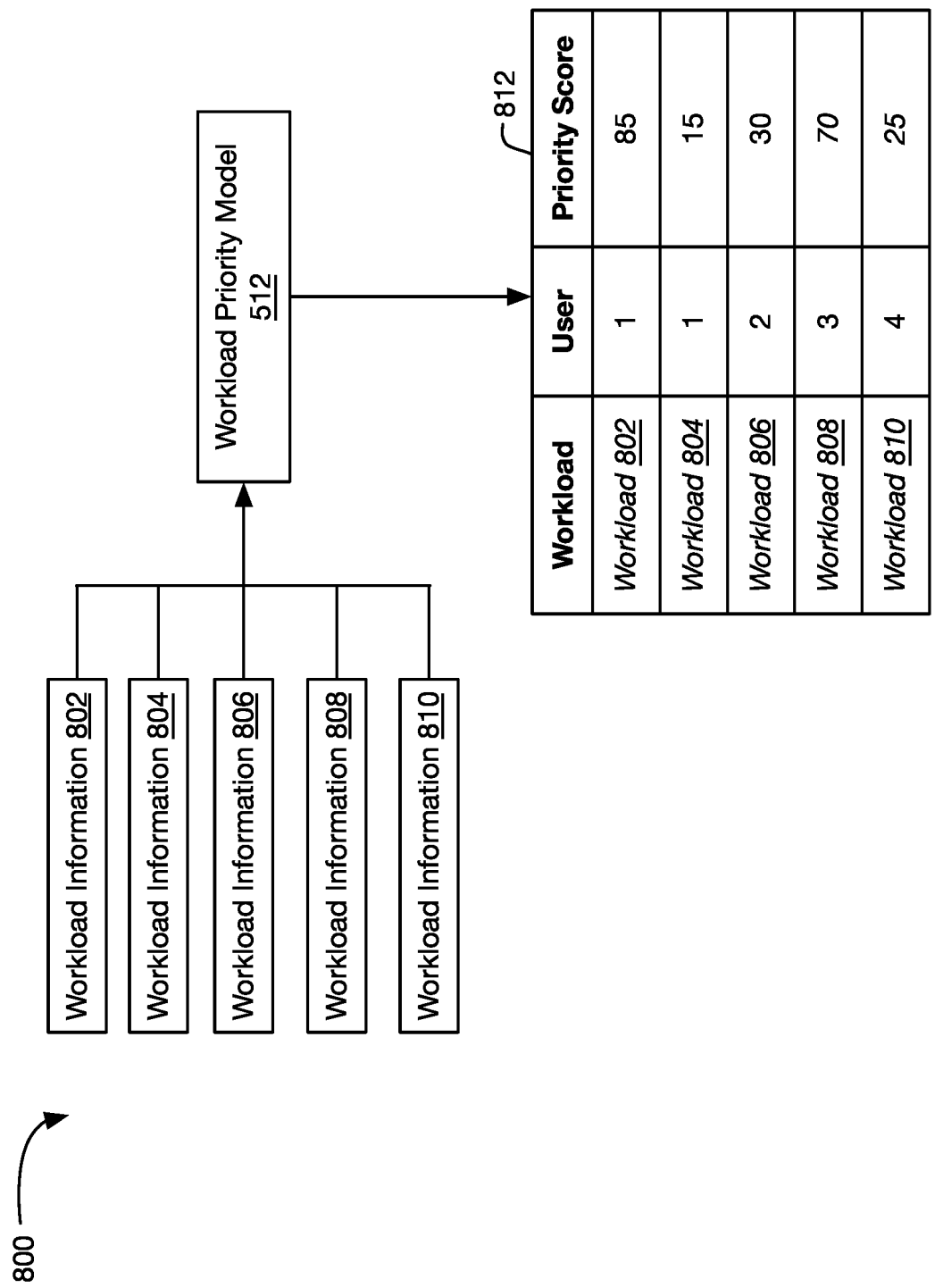
FIG. 8 depicts an operation to compute workload priority predictions according to an exemplary embodiment of the present disclosure.

FIG. 8 depicts an operation 800 to compute workload priority predictions 812 according to an exemplary embodiment of the present disclosure. The operation 800 includes the workload priority model 512, workload information 802, 804, 806, 808, 810, engagement and dependency predictions 814, and workload priority predictions 812 generated by the workload priority model 512. The workload information 802, 804, 806 may be an exemplary implementation of the workload information 504. The engagement and dependency predictions 814 may be an exemplary implementation of the engagement and dependency predictions 710 (e.g., may be received from the engagement and dependency model 510). The workload priority predictions 812 may be determined to indicate relative priorities for network resources between the plurality of workloads. The computing device 502 may be configured to determine the workload priority predictions 812 based on the workload information 802, 804, 806, 808, 810 and the engagement and dependency predictions 814. For example, the workload information 802, 804, 806, 808, 810 may include user information 516, device information 518, and application information 524. For example, the workload information 802 may indicate that a first user is an adult and is playing a competitive online video game at their usual time on a computing device that is charging. The workload information 804 may indicate that the first user is also web browsing (e.g., on the same computing device as the video game). The workload information 806 may indicate that a second user is an adult and is web browsing on a computing device that is on battery with 60% battery remaining. The workload information 808 may indicate that a third user is a teenager and a competitive gamer and is playing a video game at their usual time on a computing device that is charging and connected to power. The workload information 810 may indicate that a fourth user is a child that is streaming video content on a computing device that is on battery with 80% battery remaining. Furthermore, based on this information, the engagement and dependency predictions 814 may indicate a score of 70 associated with the workload information 802, a score of 20 associated with the workload information 804, a score of 80 associated with workload information 806, a score of 70 associated with the workload information 808, and a score of 75 associated with the workload information 810. In such instances, the workload priority predictions 812 may be determined based on the user information 516, device information 518, application information 524, and the engagement and dependency predictions 814. In particular, higher priorities may be assigned to computing devices with higher engagement and dependency predictions 814. Furthermore, certain types of users (e.g., competitive gamers playing during their regular schedule, parents/adults) and/or certain types of applications (e.g., professional applications for work, video games) may receive higher priorities. For example, as depicted, the workload information 802 receives the highest priority, followed by workload information 808, workload information 806, workload information 810, and the workload information 804 receives the lowest score.

The models 508, 510, 512, 514 may be implemented as one or more machine learning models, including supervised learning models, unsupervised learning models, other types of machine learning models, and/or other types of predictive models. For example, the models 508, 510, 512, 514 may be implemented as one or more of a neural network, a decision tree model, a support vector machine, a Bayesian network, a classifier model, a regression model, and the like. The models 508, 510, 512, 514 may be trained based on training data to generate resource predictions 610, engagement and dependency predictions 710, workload priority predictions 812, and/or network resource assignments 526. For example, one or more training datasets for the required resources model 508 may be used that contain workload information and associated expected resource predictions (e.g., at one or more service levels). As another example, one or more training datasets for the engagement and dependency model 510 may be used that contain workload information (e.g., peripheral information, application information) and associated expected engagement and dependency predictions. As a further example, one or more training datasets for the workload priority model 512 may be used that contain workload information, engagement and dependency predictions, and associated expected workload priority predictions. As a further example, one or more training datasets for the resource assignment model 514 may be used that contain workload priority predictions, resource predictions, and associated expected network resource allocations. The training data sets may specify one or more expected outputs, as noted in the preceding examples. Parameters of the models 508, 510, 512, 514 may be updated based on whether the models 508, 510, 512, 514 generate correct outputs when compared to the expected outputs. In particular, the models 508, 510, 512, 514 may receive one or more pieces of input data from the training data sets that are associated with a plurality of expected outputs. The models 508, 510, 512, 514 may generate predicted outputs based on a current configuration of the models 508, 510, 512, 514. The predicted outputs may be compared to the expected outputs, and one or more parameter updates may be computed based on differences between the predicted outputs and the expected outputs. In particular, the parameters may include weights (e.g., priorities) for different features and combinations of features. The parameter updates the models 508, 510, 512, 514 and may include updating one or more of the features analyzed and/or the weights assigned to different features or combinations of features (e.g., relative to the current configuration of the models 508, 510, 512, 514).

It should be appreciated that the depicted and discussed examples for the operations 600, 700, 800 are merely exemplary. In light of the above disclosures, one skilled in the art will appreciate that other criteria may be used to generate the predictions 610, 710, 812 for various types of workloads. All such implementations are considered within the scope of the present disclosure.

Figure 9:
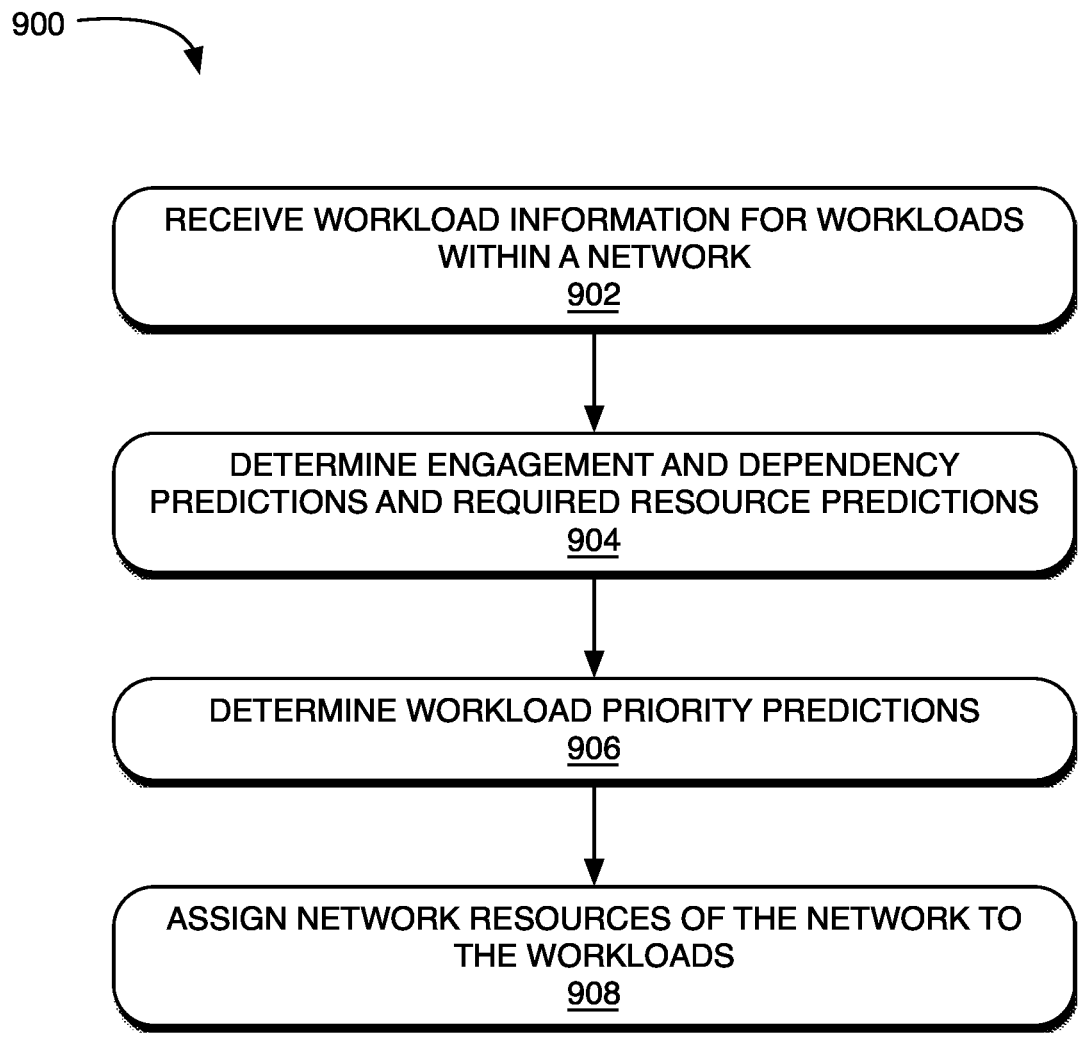
FIG. 9 depicts a method according to an exemplary embodiment of the present disclosure.

FIG. 9 depicts a method 900 according to an exemplary embodiment of the present disclosure. The method 900 may be performed to prioritize and assign network resources to multiple workloads accessing a network. The method 900 may be implemented on a computer system, such as the system 500. For example, the method 900 may be implemented by the computing device 502. The method 900 may also be implemented by a set of instructions stored on a computer readable medium that, when executed by a processor, cause the computing device to perform the method 900. Although the examples below are described with reference to the flowchart illustrated in FIG. 9, many other methods of performing the acts associated with FIG. 9 may be used. For example, the order of some of the blocks may be changed, certain blocks may be combined with other blocks, one or more of the blocks may be repeated, and some of the blocks may be optional.

The method 900 includes receiving workload information relating to a plurality of workloads executing within a network (block 902). For example, the computing device 502 may receive workload information 504, 602, 604, 606, 702, 704, 706, 802, 804, 806, 808, 810 relating to a plurality of workloads executing within a network. As explained above, the workloads may be executing on multiple computing devices and may be associated with multiple users. The workload information may include user information 516, device information 518, peripheral information 520, traffic information 522, and/or application information 524. The computing device 502 may also receive network resource information 506.

The method 900 includes determining, based on the workload information, engagement and dependency predictions for the plurality of workloads and resource predictions for the plurality of workloads (block 904). For example, the computing device may determine, based on the workload information 504, 602, 604, 606, 702, 704, 706, 802, 804, 806, 808, 810, engagement and dependency predictions 710, 814 for the plurality of workloads and resource predictions 610 for the plurality of workloads. As explained further above, the resource predictions 610 may be computed by a required resources assessment model 508 and the engagement and dependency predictions 710, 814 may be computed by an engagement and dependency model 510. In certain implementations, the engagement and dependency predictions 710, 814 may be determined based on peripheral information 520, traffic information 522, and application information 524. In certain implementations, the resource predictions 610 are determined based on application information 524.

The method 900 includes determining, based on the workload information and the engagement and dependency predictions, workload priority predictions for the plurality of workloads (block 906). For example, the computing device 502 may determine, based on the workload information 504, 602, 604, 606, 702, 704, 706, 802, 804, 806, 808, 810 and the engagement and dependency predictions 710, 814, workload priority predictions 812 for the plurality of workloads. For example, the computing device 502 may use a workload priority model 512 to compute the engagement and dependency predictions 710, 814. In certain implementations, the workload priority predictions 812 are determined based on user information 516, device information 518, application information 524, and the engagement and dependency predictions 710, 814.

The method 900 includes assigning, based on the resource predictions and workload priority predictions, network resources of the network to the plurality of workloads. (block 908). For example, the computing device 502 may assign, based on the resource predictions 610 and workload priority predictions 812, network resources of the network to the plurality of workloads. In particular, the computing device may determine network resource assignments 526 based on the resource predictions 610 and the workload priority predictions 812. In certain implementations, the network resources are assigned such that all workloads corresponding to workload priority predictions 812 that exceed a predetermined threshold are assigned at least a minimum amount of network resources identified by corresponding resource predictions 610. For example, the workload priority predictions 812 may be generated on a scale from 1 to 100. and the threshold may be, e.g., 30, 40, 50, 60, 70, or more. In certain implementations, the threshold may be 0 (e.g., so that all workloads receive the minimum amount of required resources). In certain implementations, workloads with higher priorities may be assigned additional network resources that exceed the minimum amount of network resources identified by corresponding resource predictions 610. In certain implementations, the resource assignment model may include multiple priority thresholds (e.g., associated with each level of service predicted by the required resources assessment model 508). Workloads that exceed the corresponding threshold may be assigned the corresponding amount of network resources indicated by the required network resource prediction. As explained further above, the computing device 502 may provide the network resource assignments 526 to an access point or other network administrating computing device (and/or the computing device 502 may itself be an access point or other network administrating computing device). Network resources provided to associated workloads (e.g., to packets received from or intended for associated workloads) may then be limited according to the network resource assignments 526.

The method 900 accordingly enables the dynamic assignment of network resources in a manner that ensures that the most important workloads receive the highest quality of network service. Incorporating workload information into the determination of network resource assignments helps ensure that the assigned network resources are adequate and meet the needs of workloads executing on the network (e.g., to achieve at least a minimum viable level of network service). Furthermore, incorporating engagement and dependency predictions into the determination of network resources ensures that workloads with high levels of engagement (and thus more discerning, attentive, and/or interested users) are prioritized higher and are more likely to receive additional levels of network resources and improved network performance. This reduces the likelihood that networking resources are wasted on workloads with low engagement, where the additional resources are unlikely to be noticed or capitalized on. Additionally, incorporating user information into the workload information (e.g., and the priority predictions) may ensure that the most-important users (e.g., parents, adults, employees) are prioritized higher and are thus more likely to receive adequate network resources. Accordingly, these techniques reduce the overall bandwidth required to services multiple workloads on a network and/or increase the number of workloads that can be adequately serviced by a network with a predetermined amount of network resources. In certain implementations, the method 900 may be repeated at regular intervals (e.g., every hour, every 15 minutes, every 5 minutes, every minute, every 30 seconds, every 10 seconds, every second) to reassign network resources. For example, the method 900 may be repeated to reassign network resources based on, e.g., changes in engagement for one or more of the workloads, changes in state or required network resources for one or more of the workloads, new workloads executing on the network, workloads that have stopped executing on the network, and the like.

Figure 10:
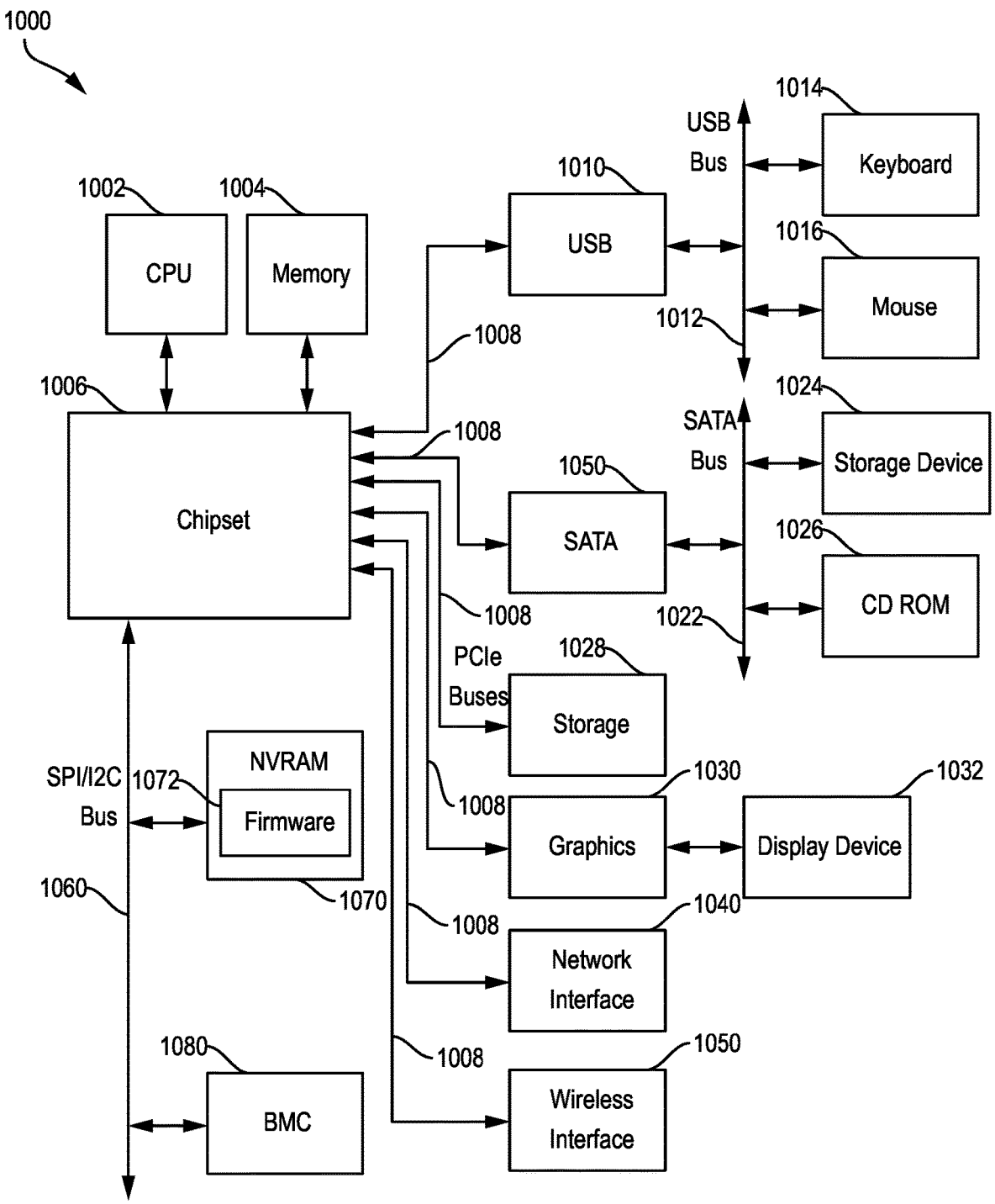
FIG. 10 is a schematic block diagram of an example information handling system according to some embodiments of the disclosure.

FIG. 10 illustrates an example information handling system 1000. Information handling system 1000 may include a processor 1002 (e.g., a central processing unit (CPU)), a memory (e.g., a dynamic random-access memory (DRAM)) 1004, and a chipset 1006. In some embodiments, one or more of the processor 1002, the memory 1004, and the chipset 1006 may be included on a motherboard (also referred to as a mainboard) which is a printed circuit board (PCB) with embedded conductors organized as transmission lines between the processor 1002, the memory 1004, the chipset 1006, and/or other components of the information handling system. The components may be coupled to the motherboard through packaging connections such as a pin grid array (PGA), ball grid array (BGA), land grid array (LGA), surface-mount technology, and/or through-hole technology. In some embodiments, one or more of the processor 1002, the memory 1004, the chipset 1006, and/or other components may be organized as a System on Chip (SoC).

The processor 1002 may execute program code by accessing instructions loaded into memory 1004 from a storage device, executing the instructions to operate on data also loaded into memory 1004 from a storage device, and generating output data that is stored back into memory 1004 or sent to another component. The processor 1002 may include processing cores capable of implementing any of a variety of instruction set architectures (ISAs), such as the x86, POWERPC®, ARM®, SPARC®, or MIPS® ISAs, or any other suitable ISA. In multi-processor systems, each of the processors 1002 may commonly, but not necessarily, implement the same ISA. In some embodiments, multiple processors may each have different configurations such as when multiple processors are present in a big-little hybrid configuration with some high-performance processing cores and some high-efficiency processing cores. The chipset 1006 may facilitate the transfer of data between the processor 1002, the memory 1004, and other components. In some embodiments, chipset 1006 may include two or more integrated circuits (ICs), such as a northbridge controller coupled to the processor 1002, the memory 1004, and a southbridge controller, with the southbridge controller coupled to the other components such as USB 1010, SATA 1020, and PCIe buses 1008. The chipset 1006 may couple to other components through one or more PCIe buses 1008.

Some components may be coupled to one bus line of the PCIe buses 1008, whereas some components may be coupled to more than one bus line of the PCIe buses 1008. One example component is a universal serial bus (USB) controller 1010 which interfaces the chipset 1006 to a USB bus 1012. A USB bus 1012 may couple input/output components such as a keyboard 1014 and a mouse 1016 but also other components such as USB flash drives or another information handling system. Another example component is a SATA bus controller 1020, which couples the chipset 1006 to a SATA bus 1022. The SATA bus 1022 may facilitate efficient transfer of data between the chipset 1006 and components coupled to the chipset 1006 and a storage device 1024 (e.g., a hard disk drive (HDD) or solid-state disk drive (SDD)) and/or a compact disc read-only memory (CD-ROM) 1026. The PCIe bus 1008 may also couple the chipset 1006 directly to a storage device 1028 (e.g., a solid-state disk drive (SDD)). A further example of an example component is a graphics device 1030 (e.g., a graphics processing unit (GPU)) for generating output to a display device 1032, a network interface controller (NIC) 1040, and/or a wireless interface 1050 (e.g., a wireless local area network (WLAN) or wireless wide area network (WWAN) device) such as a Wi-Fi® network interface, a Bluetooth® network interface, a GSM® network interface, a 3G network interface, a 4G LTE® network interface, and/or a 5G NR network interface (including sub-6 GHz and/or mmWave interfaces).

The chipset 1006 may also be coupled to a serial peripheral interface (SPI) and/or Inter-Integrated Circuit (I2C) bus 1060 which couples the chipset 1006 to system management components. For example, a non-volatile random-access memory (NVRAM) 1070 for storing firmware 1072 may be coupled to the bus 1060. As another example, a controller, such as a baseboard management controller (BMC) 1080, may be coupled to the chipset 1006 through the bus 1060. BMC 1080 may be referred to as a service processor or embedded controller (EC). Capabilities and functions provided by BMC 1080 may vary considerably based on the type of information handling system. For example, the term baseboard management system may be used to describe an embedded processor included at a server, while an embedded controller may be found in a consumer-level device. As disclosed herein, BMC 1080 represents a processing device different from processor 1002 which provides various management functions for information handling system 1000. For example, an embedded controller may be responsible for power management, cooling management, and the like. An embedded controller included at a data storage system may be referred to as a storage enclosure processor or a chassis processor.

System 1000 may include additional processors that are configured to provide localized or specific control functions, such as a battery management controller. Bus 1060 can include one or more buses, including a Serial Peripheral Interface (SPI) bus, an Inter-Integrated Circuit (I2C) bus, a system management bus (SMBUS), a power management bus (PMBUS), or the like. BMC 1080 may be configured to provide out-of-band access to devices at information handling system 1000. Out-of-band access in the context of the bus 1060 may refer to operations performed prior to execution of firmware 1072 by processor 1002 to initialize operation of system 1000.

Firmware 1072 may include instructions executable by processor 102 to initialize and test the hardware components of system 1000. For example, the instructions may cause the processor 1002 to execute a power-on self-test (POST). The instructions may further cause the processor 1002 to load a boot loader or an operating system (OS) from a mass storage device. Firmware 1072 additionally may provide an abstraction layer for the hardware, such as a consistent way for application programs and operating systems to interact with the keyboard, display, and other input/output devices. When power is first applied to information handling system 1000, the system may begin a sequence of initialization procedures, such as a boot procedure or a secure boot procedure. During the initialization sequence, also referred to as a boot sequence, components of system 1000 may be configured and enabled for operation and device drivers may be installed. Device drivers may provide an interface through which other components of the system 1000 can communicate with a corresponding device. The firmware 1072 may include a basic input-output system (BIOS) and/or include a unified extensible firmware interface (UEFI). Firmware 1072 may also include one or more firmware modules of the information handling system. Additionally, configuration settings for the firmware 1072 and firmware of the information handling system 1000 may be stored in the NVRAM 1070. NVRAM 1070 may, for example, be a non-volatile firmware memory of the information handling system 1000 and may store a firmware memory map namespace of the information handling system. NVRAM 1070 may further store one or more container-specific firmware memory map namespaces for one or more containers concurrently executed by the information handling system.

Information handling system 1000 may include additional components and additional buses, not shown for clarity. For example, system 1000 may include multiple processor cores (either within processor 1002 or separately coupled to the chipset 1006 or through the PCIe buses 1008), audio devices (such as may be coupled to the chipset 1006 through one of the PCIe buses 1008), or the like. While a particular arrangement of bus technologies and interconnections is illustrated for the purpose of example, one of skill will appreciate that the techniques disclosed herein are applicable to other system architectures. System 1000 may include multiple processors and/or redundant bus controllers. In some embodiments, one or more components may be integrated together in an integrated circuit (IC), which is circuitry built on a common substrate. For example, portions of chipset 1006 can be integrated within processor 1002. Additional components of information handling system 1000 may include one or more storage devices that may store machine-executable code, one or more communications ports for communicating with external devices, and various input and output (I/O) devices, such as a keyboard, a mouse, and a video display.

In some embodiments, processor 1002 may include multiple processors, such as multiple processing cores for parallel processing by the information handling system 1000. For example, the information handling system 1000 may include a server comprising multiple processors for parallel processing. In some embodiments, the information handling system 1000 may support virtual machine (VM) operation, with multiple virtualized instances of one or more operating systems executed in parallel by the information handling system 1000. For example, resources, such as processors or processing cores of the information handling system, may be assigned to multiple containerized instances of one or more operating systems of the information handling system 1000 executed in parallel. A container may, for example, be a virtual machine executed by the information handling system 1000 for execution of an instance of an operating system by the information handling system 1000. Thus, for example, multiple users may remotely connect to the information handling system 1000, such as in a cloud computing configuration, to utilize resources of the information handling system 1000 such as memory, processors, and other hardware, firmware, and software capabilities of the information handling system 1000. Parallel execution of multiple containers by the information handling system 1000 may allow the information handling system 1000 to execute tasks for multiple users in parallel secure virtual environments.

The schematic or flow chart diagrams of FIGS. 4-9 are generally set forth as a logical flow chart diagram. As such, the depicted order and labeled steps are indicative of aspects of the disclosed method. Other steps and methods may be conceived that are equivalent in function, logic, or effect to one or more steps, or portions thereof, to the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Machine learning models, as described herein, may include logistic regression techniques, linear discriminant analysis, linear regression analysis, artificial neural networks, machine learning classifier algorithms, or classification/regression trees in some embodiments. In various other embodiments, machine learning systems may employ Naive Bayes predictive modeling analysis of several varieties, learning vector quantization artificial neural network algorithms, or implementation of boosting algorithms such as Adaboost or stochastic gradient boosting systems for iteratively updating weighting to train a machine learning classifier to determine a relationship between an influencing attribute, such as received device data, and a system, such as an environment or particular user, and/or a degree to which such an influencing attribute affects the outcome of such a system or determination of environment.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks, and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions, and alterations can be made herein without departing from the spirit and scope of the disclosure as defined by the appended claims. Moreover, the scope of the present application is not intended to be limited to the particular embodiments of the process, machine, manufacture, composition of matter, means, methods, and steps described in the specification. For example, although processors are described throughout the detailed description, aspects of the invention may be applied to the design of or implemented on different kinds of processors, such as graphics processing units (GPUs), central processing units (CPUs), and digital signal processors (DSPs). As another example, although processing of certain kinds of data may be described in example embodiments, other kinds or types of data may be processed through the methods and devices described above. As one of ordinary skill in the art will readily appreciate from the present disclosure, processes, machines, manufacture, compositions of matter, means, methods, or steps presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:
1. A method, comprising:
receiving workload information relating to a plurality of workloads executing within a network;

determining, based on the workload information, engagement and dependency predictions for the plurality of workloads and resource predictions for the plurality of workloads, wherein the engagement and dependency predictions are determined to indicate at least one of (i) user engagement for respective workloads and/or (ii) multi-user dependencies for the respective workloads, wherein the workload information includes peripheral information, traffic information, and application information, and wherein the engagement and dependency predictions are determined based on the peripheral information, the traffic information, and the application information;

determining, based on the workload information and the engagement and dependency predictions, workload priority predictions for the plurality of workloads, wherein the engagement and dependency predictions are determined based on user information associated with at least a subset of the plurality of workloads; and assigning, based on the resource predictions and workload priority predictions, network resources of the network to the plurality of workloads.

2. The method of claim 1, wherein the user information includes usage patterns for associated users, and wherein the usage patterns identify at least one user as a competitive gamer, and wherein higher workload priority predictions are determined for gaming workloads associated with the at least one user.

3. The method of claim 2, wherein the user information includes priority information for associated users, and wherein the higher workload priority predictions are determined for workloads associated with users that have a higher priority.

4. The method of claim 1, wherein the peripheral information for a first workload indicates that a user is actively watching an associated computing device, and wherein a higher engagement and dependency is determined for the first workload based on the peripheral information.

5. The method of claim 1, wherein the resource predictions are determined to indicate network resources required for at least one quality of service for respective workloads.

6. The method of claim 5, wherein the workload information includes application information, and wherein the resource predictions are determined based on the application information.

7. The method of claim 6, wherein gaming applications receive higher resource predictions than web browsing applications.

8. The method of claim 1, wherein the workload priority predictions are determined to indicate relative priorities for network resources between the plurality of workloads.

9. The method of claim 1, wherein the network resources are assigned such that all workloads corresponding to workload priority predictions that exceed a predetermined threshold are assigned at least a minimum amount of network resources identified by corresponding resource predictions.

10. The method of claim 9, wherein workloads with higher priorities are assigned additional network resources that exceed the minimum amount of network resources identified by corresponding resource predictions.

11. An information handling system, comprising:
a memory; and
a processor coupled to the memory, wherein the processor is configured to perform steps comprising:
receiving workload information relating to a plurality of workloads executing within a network;
determining, based on the workload information, engagement and dependency predictions for the plurality of workloads and resource predictions for the plurality of workloads, wherein the engagement and dependency predictions are determined to indicate at least one of (i) user engagement for respective workloads and/or (ii) multi-user dependencies for the respective workloads, wherein the workload information includes peripheral information, traffic information, and application information, and wherein the engagement and dependency predictions are determined based on the peripheral information, the traffic information, and the application information;
determining, based on the workload information and the engagement and dependency predictions, workload priority predictions for the plurality of workloads, wherein the engagement and dependency predictions are determined based on user information associated with at least a subset of the plurality of workloads; and
assigning, based on the resource predictions and workload priority predictions, network resources of the network to the plurality of workloads.

12. The information handling system of claim 11, wherein the user information includes usage patterns for associated users, and wherein the usage patterns identify at least one user as a competitive gamer, and wherein higher workload priority predictions are determined for gaming workloads associated with the at least one user.

13. The information handling system of claim 12, wherein the user information includes priority information for associated users, and wherein the higher workload priority predictions are determined for workloads associated with users that have a higher priority.

14. A computer program product, comprising:
a non-transitory medium storing instructions which, when executed by a processor, cause the processor to perform steps comprising:
receiving workload information relating to a plurality of workloads executing within a network;
determining, based on the workload information, engagement and dependency predictions for the plurality of workloads and resource predictions for the plurality of workloads, wherein the engagement and dependency predictions are determined to indicate at least one of (i) user engagement for respective workloads and/or (ii) multi-user dependencies for the respective workloads, wherein the workload information includes peripheral information, traffic information, and application information, and wherein the engagement and dependency predictions are determined based on the peripheral information, the traffic information, and the application information;
determining, based on the workload information and the engagement and dependency predictions, workload priority predictions for the plurality of workloads, wherein the engagement and dependency predictions are determined based on user information associated with at least a subset of the plurality of workloads; and
assigning, based on the resource predictions and workload priority predictions, network resources of the network to the plurality of workloads.

15. The computer program product of claim 14, wherein the user information includes usage patterns for associated users, and wherein the usage patterns identify at least one user as a competitive gamer, and wherein higher workload priority predictions are determined for gaming workloads associated with the at least one user.

16. The computer program product of claim 15, wherein the user information includes priority information for associated users, and wherein the higher workload priority predictions are determined for workloads associated with users that have a higher priority.

* * * * *